Dec. 21, 1954     T. H. KIRK     2,697,346
APPARATUS FOR TESTING VEHICLES BY IMPARTING IMPACTS TO A WHEEL
THEREOF FOR LOCATING RATTLES, SQUEAKS, AND THE LIKE
Filed Dec. 23, 1948     2 Sheets-Sheet 1
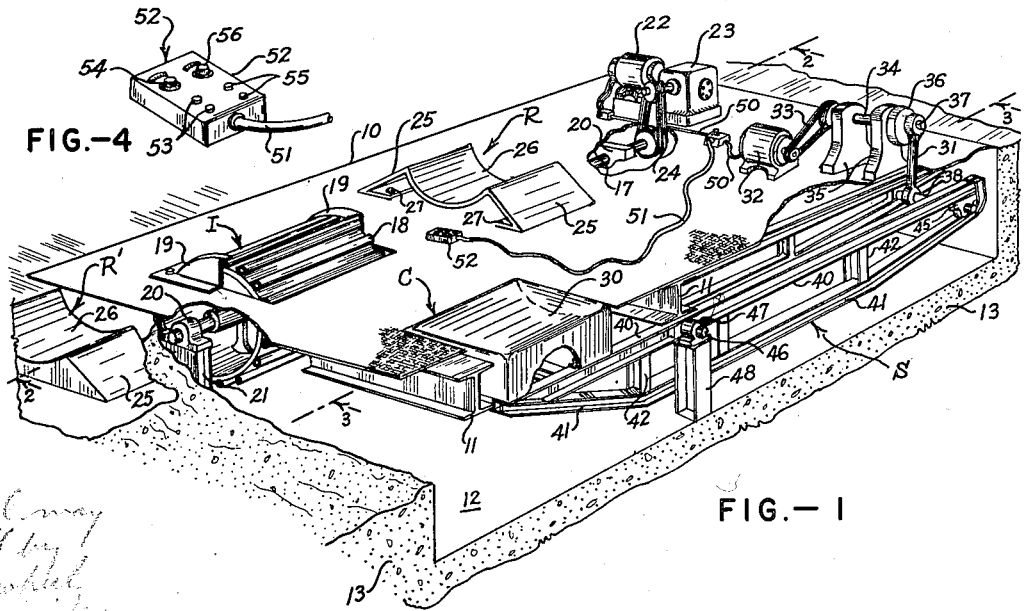
FIG.—1
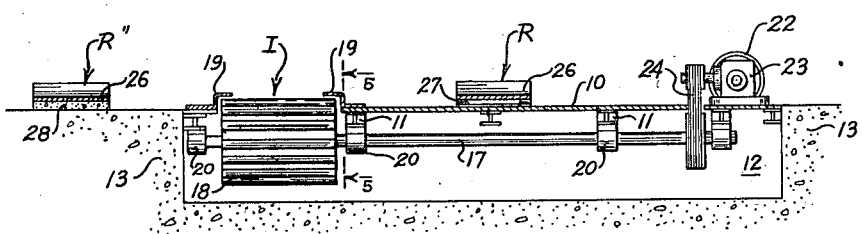
FIG.—2
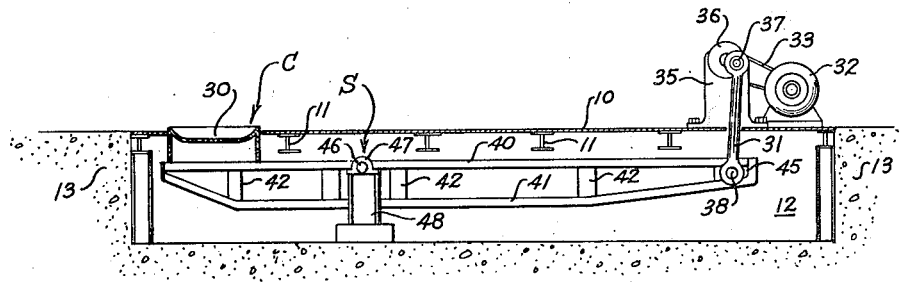
FIG.—3
*INVENTOR.*
Theodore H. Kirk
BY
*Lamphere & Van Valkenburgh*
ATTORNEYS

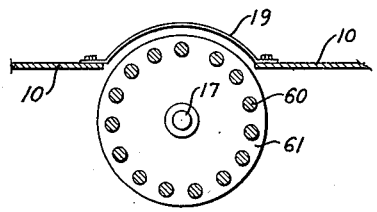
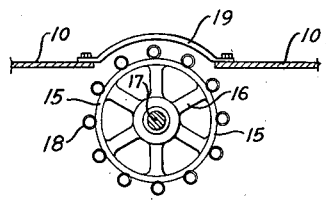
FIG.-8    FIG.-5
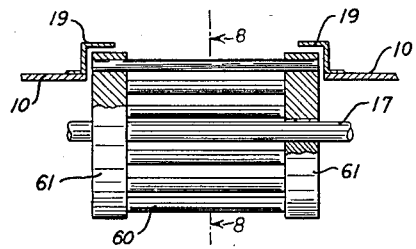
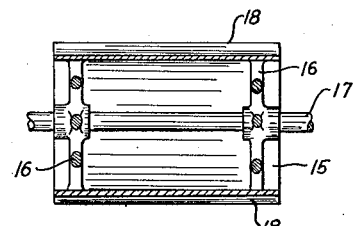
FIG.-7    FIG.-6
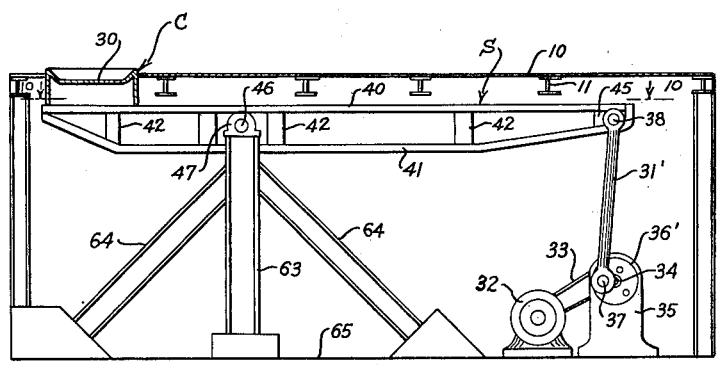
FIG.-9
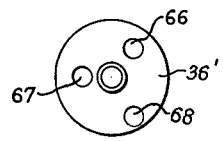
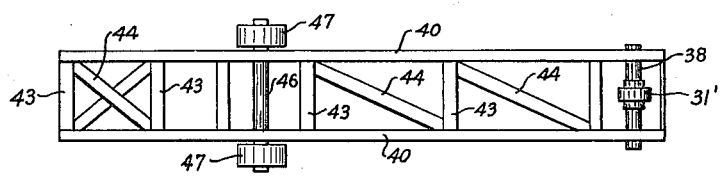
FIG.-11    FIG.-10
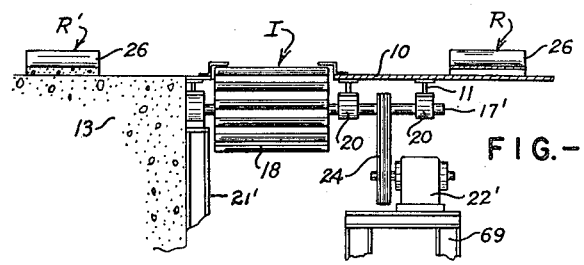
FIG.-12
*INVENTOR.*
Theodore H. Kirk
BY
*Lamphere & Van Valkenburgh*
ATTORNEYS United States Patent Office 2,697,346
Patented Dec. 21, 1954

2,697,346

APPARATUS FOR TESTING VEHICLES BY IMPARTING IMPACTS TO A WHEEL THEREOF FOR LOCATING RATTLES, SQUEAKS, AND THE LIKE

Theodore H. Kirk, Denver, Colo.

Application December 23, 1948, Serial No. 67,063

6 Claims. (Cl. 73—72)

This invention relates to an apparatus and method for testing vehicles, and more particularly to an apparatus and method for testing vehicles such as automobiles and the like, for rattles, squeaks and other noises indicative of parts which are loose, lack lubrication, or the like.

Not only are rattles and other noises a source of irritation to the operator of a vehicle, but also are indicative of conditions which may ultimately produce a breakdown or require costly repairs. Furthermore, not only do older vehicles tend to develop rattles, squeaks, and the like, but also new vehicles, such as automobiles when delivered to a dealer, often produce rattles or squeaks when first driven. Thus, it is customary for a dealer, prior to delivery of a new automobile to the purchaser, to have the new automobile taken out on a rough road, so that any squeaks or rattles can be located. After such a road test, the automobile is usually taken back to the garage, where the position of the parts causing such rattles or squeaks is attempted to be located more accurately. Such road tests are time consuming, and often entail greater expense than any other step in the preparation of the automobile for delivery to the purchaser.

Furthermore, when an automobile, for instance, is brought into a garage in order to have one or more rattles or squeaks eliminated, it is usually necessary to take the automobile out on a road test, as described above, and also usually necessary to repeat the road test after the mechanic believes that the squeaks or rattles have been found and corrected. It sometimes happens that the garage mechanic does not know exactly which rattle or squeak is creating the most annoyance, and may correct several of the more obvious ones, without correcting the one which caused the most annoyance. Thus, it is highly desirable that the owner or operator be able to be present at the time the automobile is tested and so be able to tell the mechanic just which rattle or squeak prompted the visit. If the automobile could be tested for rattles and squeaks within a matter of a minute or a few minutes, much time for both the mechanic and the owner could be saved. Furthermore, if an automobile is brought in for a general checkup, an adequate test for rattles and squeaks, without the necessity for a time consuming road test, would add to the satisfaction of both the garage operator and the owner of the automobile.

Among the objects of the present invention are to provide a novel method of testing a vehicle for rattles, squeaks and the like; to provide such a testing method which will require only a short time, yet is normally more accurate than a road test; to provide such a testing method which will tend to insure that all rattles and squeaks will be located; to provide apparatus for testing vehicles which is particularly adapted to carry out the above method; to provide such apparatus which can be conveniently installed in a garage or the like; to provide such apparatus which requires a minimum of space; to provide such apparatus which can be operated by a single individual, such as a mechanic, who can carry out the entire test in a relatively short period of time; to provide such apparatus which requires no extraneous locking devices or vibration imparting levers to be attached to the automobile; to provide such apparatus which may be so constructed that the automobile to be tested may merely be driven onto the same, and driven off after the test is completed; to provide such apparatus in which the mechanic can carry out a complete test in any desired position, such as in the automobile, under the automobile, or in other positions; to provide various safety features for such apparatus; to provide such apparatus which may be made in various forms and installed under various conditions; and to provide such apparatus which is sturdy in construction and will stand up under hard wear and abuse. Additional objects, and the novel features of this invention, will become apparent from the description which follows.

In the method of the present invention, a vehicle is tested for rattles, squeaks and the like, by producing a series of impacts in rapid succession against a rotatable portion of the vehicle, such as a wheel, while rotating the wheel; and changing the frequency of impact over a sufficiently wide range to insure that all rattles or the like which would be produced while driving at different speeds over various types of roads, will be produced during the test. In further accordance with this invention, a series of reciprocating movements are applied to an accessible member of the vehicle, preferably a wheel, such reciprocating movement being in both a generally vertical and a generally lateral direction, and the rate or frequency of the reciprocations is also varied over a predetermined range. In further accordance with this invention, the impacts and also the reciprocations, the frequency of each being varied, are applied to the same or different wheels, such as to each wheel in succession.

The combination of impact and reciprocation, although normally applied to the wheels separately, serves to ferret out and locate all rattles or squeaks which are present and can be located. Often a rattle or squeak develops which is more responsive to impact than reciprocation, or vice versa, and sometimes a part which has been tightened so that it no longer rattles when one or more of the wheels is subjected to impact, will nevertheless rattle or squeak when one or more of the wheels is subjected to reciprocation, or vice versa. It will thus be evident that the method of this invention contemplates not only the impact or reciprocation of one or more wheels, the application of each being made over a frequency range, but also the combination of the two, which together contributes to the final result desired—i. e., the elimination of the objectionable noise.

Apparatus particularly adapted to carry out the foregoing method is illustrated in the accompanying drawings, in which:

Fig. 1 is a perspective view, partly broken away, of vehicle testing apparatus constructed in accordance with this invention;

Fig. 2 is a vertical section taken along line 2—2 of Fig. 1;

Fig. 3 is a vertical section taken along line 3—3 of Fig. 1;

Fig. 4 is an enlarged perspective view of a control box which forms a part of the apparatus of Fig. 1;

Fig. 5 is an end view of an impact producing cylinder, taken along line 5—5 of Fig. 2;

Fig. 6 is a vertical longitudinal section of the cylinder;

Fig. 7 is a side elevation of an alternative form of cylinder, partly broken away and also showing certain associated parts;

Fig. 8 is a central section of the alternative cylinder, taken along the line 8—8 of Fig. 7;

Fig. 9 is a vertical section, similar to Fig. 3, but illustrating an alternative type of installation;

Fig. 10 is a top plan view of a truss structure forming a part of the apparatus shown in Fig. 9, and taken from line 10—10 of Fig. 9;

Fig. 11 is an enlarged end view of a crank pulley, forming a portion of the apparatus of Fig. 9; and Fig. 12 is a vertical section similar to Fig. 2, but illustrating another portion of the alternative installation, a portion of which is shown in Fig. 9.

Apparatus constructed in accordance with this invention, as shown in Fig. 1, may include an impact producing device, such as a cylinder I adapted to produce a series of impacts in short succession against a rotatable portion of a vehicle, such as the tire on an automobile wheel. The top of cylinder I is disposed a short distance above floor level, such as the level of a plate 10 having a suitable aperture to accommodate cylinder I, while plate 10 may be supported by beams 11 above a pit 12, provided in a foundation 13 of the remainder of the floor. As will be evident, any front or rear wheel of the automobile may be driven onto the cylinder I, while the opposite front or rear wheel is engaged by a stop device, such as a rest R or R' which prevents the automobile from moving out of position during the rotation and impacts delivered against the wheel. In accordance with this invention, the two rests R and R', which comprise stop means, are disposed on opposite sides of and laterally with respect to the cylinder I, so that when the left front wheel, for instance, is driven onto the cylinder I, the companion or right front wheel will be engaged by the rest R on one side of the cylinder I, and when the right front wheel is driven onto the cylinder I, the companion or left front wheel will be engaged by the opposite rest R'. As will be evident, when one of the rear wheels is driven onto the cylinder I, the companion rear wheel will be engaged by one of the rests R or R'.

The impact cylinder I, as also shown in Figs. 2, 5 and 6, may comprise a cylindrical drum 15 mounted by arms 16 on a shaft 17, the periphery of the drum being provided with a plurality of projections 18 which are preferably arcuate in cross sections, such as produced by a series of pipes, welded or otherwise suitably attached in longitudinal position to the periphery of drum 15. The drum 15 and pipes or projections 18 may be of any suitable size and spacing, such as the drum 15 being about 36 inches in diameter, the pipes 18 about 1 inch in diameter, and spaced approximately 4 inches apart around the periphery of the drum 15. The cylinder I is preferably installed so that the automobile may be driven thereon and the wheels will be rotated in the normal direction of road travel, particularly since the cast and camber of the front wheels might tend to twist the front end of the automobile off the cylinder I, if driven in a reverse direction.

A shield or guard 19 is preferably provided at each end of the impact cylinder I, to prevent accidental contact by a mechanic or tools with the rotating cylinder, particularly at the ends thereof. The shaft 17 may be mounted in bearings 20, supported from beams 11, as shown in Fig. 2, or one or more bearings may each be mounted on a post 21, as shown in Fig. 1. Shaft 17 may be driven by a variable speed motor 22, mounted on floor plate 10 and acting through a speed reducer 23 and an additional speed reducing V-belt drive 24. Each rest R and R' may be provided with an inclined approach and/or leaving surface 25 at each end and a central well or depression 26, preferably generally arcuate and formed on a radius just slightly greater than the radius of the largest tire expected to be received therein. The extent of the well 26 is preferably such that there is no tendency for the automobile wheel to move therefrom during impact of the opposite front or rear wheel, and the inclination of the surface 25 is preferably such that the automobile is readily driven onto and off the rest R.

Each rest may be made in a suitable manner, the rest R being shown as made from heavy sheet or plate metal bent to form the surfaces 25 and well 26, as well as bottom interior flanges 27 by which the rest may be attached to the floor. Or, as in the case of the rest R' of Fig. 1, it may be made entirely of concrete or other material cast previously, or cast in situ. Again, as in the case of the rest R'' of Fig. 2, the surfaces 25 and well 26 may be formed of sheet or plate metal, and the interior filled with concrete 28 or the like. The latter is perhaps the preferred construction, since the strength of the concrete is coupled with the wear resistant qualities of the metal cover.

In addition to the impact cylinder I, the apparatus of this invention includes a reciprocating cup or wheel receiver C which is in alignment with cylinder I and extends through a suitable aperture in plate 10. Cup C may, in effect, be a sheet or plate metal box having a well 30 in the top thereof in which the wheel of an automobile is adapted to rest. The cup C is preferably mounted on one end of a pivoted support S, which may be formed as a truss structure as shown, the opposite end of support S being reciprocated by a connecting rod 31, driven from a motor 32. As in Figs. 1 and 3, the motor 32 may be connected by a speed reducing V-belt drive 33 with a shaft 34 mounted in bearing blocks 35, motor 32 and bearing blocks 35 conveniently being mounted on floor plate 10. Shaft 34 is provided at its opposite end with a crank pin pulley 36, the connecting rod 31 being pivotally mounted at its upper end on a crank pin 37 and at its lower end on a shaft 38 which extends transversely of the support S.

The support S may be formed as a single structural member, or made up of several members, such as bars, angles, channels, I-beams and the like. In the construction shown in Figs. 1 and 3, which is also similar to that shown in Fig. 10, the support S may be a truss structure having spaced parallel upper chords 40 and spaced parallel lower chords 41, the latter being inclined upwardly at each end toward the upper chords 40. Vertical stiffeners or struts 42 may extend between the upper and lower chords, as in Fig. 3, while cross struts 43 and diagonal struts 44, as in Fig. 10, may extend between the pairs of chords. Shaft 38 may be attached to one end of the truss structure by blocks 45, while a central shaft 46, on which the support is pivoted, may extend through the upper chords 40. Shaft 46 may be mounted in end bearings 47, each in turn mounted on top of posts 48, or supported in any other suitable manner, as from one of the beams 11. As in Figs. 1 and 3, the cup C is mounted on the upper chords 40 at one end, and the central shaft 46 is preferably placed closer to the cup C than to the connecting rod 31, in order to provide an additional mechanical advantage in lifting the weight imposed on the cup C during the reciprocation of a wheel of a vehicle being tested. A suitable ratio for the distance between the central shaft 46 and the connecting rod shaft 31 and cup C, respectively, is 2 to 1.

The motors 22 and 32 are connected by fixed cables 50 and a movable cable 51 with a transportable control box 52, which is adapted to be carried into the vehicle being tested by the mechanic or operator, and utilized not only in starting and stopping the motors 22 and 32, but also in regulating their speed. For the latter purpose, the control box 52, as in Fig. 4, may be provided with stop and start push buttons 53 and a control dial 54 for motor 22, as well as stop and start push buttons 55 and a speed control dial 56 for motor 32. As will be evident, when the mechanic or operator drives the automobile to be tested, for instance, onto the apparatus, so that one of the wheels will rest either on impact cylinder I or in cup C, the portable control box 52 can readily be taken inside the automobile, and the motor 22 started, in the event that the impact portion of the test is made first. As the speed of motor 22 is increased, the impacts will increase in frequency, so that a wide range of vibration is imparted to the wheel, and through the wheel to adjacent portions of the automobile. After one of the front wheels has been tested, the same front wheel may be driven onto the cup C, without the necessity for the operator or the mechanic leaving the automobile, after which the motor 32 may be started and its speed varied over a predetermined range, so that the wheel will be subjected not only to a substantially vertical reciprocal motion, but also to a lateral reciprocal motion, the same being evident from the fact that the cup C moves in an arc, rather than along a straight line. A slightly different type of vibration will be produced by the cup C, than was produced by the impact cylinder I, the motion produced by the cup being more of a shaking, as distinguished from a series of sharp blows from the impact cylinder I. As indicated previously, there may be some rattles or squeaks which will become more pronounced due to the impacts produced by the cylinder I than the shaking produced by cup C, or vice versa. Also, if a noise is located through one of the two and a correction made, the vehicle should be tested on the other, to make sure that the noise will not be produced, irrespective of road conditions. In testing the vehicle, the operator listens to the position of the noise, and is able to devote his full attention to finding the source of the noise and tightening or lubricating the offending part, or otherwise making a correction. Also, when there are a number of noises occurring simultaneously, it is usually the case that a certain frequency or speed of impact or reciprocation will bring out one of the noises more than another. In this way, the sources of several different noises can be much more easily traced.

When the noise appears to come from underneath the car, it may be desirable for the mechanic to get under the car in order to make a correction. Due to the danger involved in clothing, tools or the like becoming caught in the rotating impact cylinder I, the mechanic may prefer not to operate the impact cylinder as long as he is under the car, despite the safety shields or guards 19. However, it will often be found possible, in the event that the noise appears to come from the front of the car, for instance, to vibrate or reciprocate a rear wheel while finding the source of the noise and correcting the same at the front. The reciprocations of the cup C need not be particularly great in amplitude, such as about 3 inches, which normally gives the mechanic sufficient space to work under the automobile. While under the automobile, the mechanic may, of course, take the portable control box 52 right with him, and change the rate of reciprocation over a sufficient range that all noises will be brought out clearly.

As will be evident, there are numerous variations which may be made in the apparatus of this invention. For instance, the impact cylinder I may be constructed in the manner shown in Figs. 7 and 8, in which a series of longitudinally extending, circumferentially spaced rods 60 are mounted between circular end plates 61, which in turn are mounted on shaft 17. If desired, a circular strip may be inserted just inside the rods 60, to form a surface having a position relative to rods 60 similar to the relative position of the surface of drum 15 of Fig. 5 relative to pipes 18, and which will reduce the tendency for tools or the like to be caught between the rods. The rods 60 may have the same diameter and spacing as the pipes 18 of Figs. 5 and 6, although other sizes and spacing may be utilized.

When the apparatus of this invention is to be installed on an upper floor, or on the main floor of a garage or the like which has a basement, or if it is desired to mount the motors 22 and 32 in a position other than at the same floor level as the impact cylinder I and cup C, the type of installation illustrated in Figs. 9 to 12 may be utilized. As in Fig. 9, the bearings 47 for shaft 46 of the cup support S may each be mounted on top of a column 63, provided with braces 64, if desired, while shaft 46 may extend through a pair of side struts 42, or blocks similar to blocks 45 for shaft 38 provided. Motor 32 and bearing blocks 35 may be mounted on the floor 65 of the basement, while the connecting rod 31' may be longer than the connecting rod 31 of Figs. 1 and 3. The crank pin pulley 36', as in Fig. 11, may be provided with a series of holes 66, 67 and 68, respectively, which are disposed in spaced positions but at increasing radii, so that the crank pin 37 may be placed in any one of the holes, to vary the amplitude of the reciprocation of the cup C. The crank pin pulley 36 of Figs. 1 and 3 may also be constructed in a similar manner, or other suitable means used to provide an adjustment of the amplitude of reciprocation. Also, if it is desired to mount the motors beneath the floor level, the pit 12 of Fig. 1 may be made sufficiently deep to accommodate the same. When the motor for cylinder I is installed below floor level, as in Fig. 12, the shaft for impact cylinder I need not be as long as the shaft 17 of Fig. 2, the shaft 17' of Fig. 12 being mounted in bearings 20, which are supported from floor plate 10 or beams 11, or one or more of which may be mounted on a post 21'. The motor 22' for rotating the impact cylinder I may be mounted on a platform 69, and also may be provided with an integral speed reducer, if desired, while the V-belt drive 24 may be similar to that of Figs. 1 and 2.

The gear and V-belt drive pulley ratio between the motor 22 and impact cylinder I is preferably such that the impact cylinder I and shaft 17 may be rotated at speeds between a relatively low speed, such as less than 50 R. P. M. and up to 500 or 600 R. P. M., while the speed reduction between the motor 32 and the cup C is preferably such that the cup C will be reciprocated from a relatively low value, such as less than 20 reciprocations per minute, up to 300 or 400 per minute, i. e. so that the shaft 34 may be rotated between 20 or less and up to 300 or 400 R. P. M. It is unnecessary to be able to reduce the speed of either motor 22 or 32 to a zero value, although the same is not objectionable.

From the foregoing, it will be evident that the method and apparatus of this invention fulfill to a marked degree the requirements and objects hereinbefore set forth. As indicated previously, the ability to bring out all rattles, squeaks or other noises which might be produced by bumps, vibrations or other road or driving conditions, is of particular advantage. The provision of the impact cylinder and the reciprocating cup in alignment with each other, so that the vehicle may be moved from one to the other without difficulty, is of considerable importance, particularly when coupled with the portable control box, which enables the mechanic or operator to run the entire test without leaving the vehicle. Also, the ability to run through the entire test in a very short period of time not only reduces the cost of testing, but also insures a more efficient job. The combination of the impact cylinder with a rest at either side thereof enables any wheel of the automobile to be placed on the impact cylinder without the necessity of the mechanic or operator fastening the vehicle down to the floor. In fact, during the entire test, there is no necessity for tie rods or other fastening devices. The necessity for only one impact cylinder and one reciprocating cup simplifies the installation, while the ready movement of the vehicle from the impact cylinder to the cup, or vice versa, and the ready movement from wheel to wheel without any additional preparation or adjustment, permit the entire testing operation to be carried out in a minimum of time. The use of a range of speeds, both to produce a range of frequency of impact and a range in the frequency of reciprocatory or vibratory movement, insures satisfactory results. The use of a member having a well in the top, such as cup C, mounted on a pivoted support, insures that not only will the reciprocatory movement be vertical, but also in part horizontal. The well effectively prevents the wheel from moving out of the cup, and this test may also be run with brakes set.

Although several variations in the parts and in the manner of installation have been described or indicated, it will be understood that other variations may be made, and that other embodiments of this invention may exist, all without departing from the spirit and scope thereof.

What is claimed is:

1. Apparatus for testing a vehicle for rattles, squeaks and the like, such vehicle having a plurality of wheels, comprising a horizontal rotary device having an irregular surface for engaging and for imparting a series of impacts in rapid succession to the lower periphery of a wheel while rotating the same; means for changing the speed of rotation of said device and thereby change the frequency of said impacts over a predetermined range; and a stop device for engaging a companion wheel to prevent movement of said vehicle during such impacts, said stop device having at each end an inclined approach and leaving surface, and a central well adapted to receive said companion wheel.

2. Apparatus for testing a vehicle for rattles, squeaks and the like, as defined in claim 1, wherein said rotary device includes a drum having a series of pipes attached to the outer periphery in spaced, longitudinally extending relationship.

3. Apparatus for testing a wheeled vehicle, such as an automobile, for rattles, squeaks and the like, said apparatus being adapted to be installed with a portion thereof projecting above a pit, comprising a horizontal shaft; a rotatable impact cylinder, for supporting a wheel of the vehicle, mounted on said shaft and having a plurality of spaced projections about the circumference thereof, each said projection extending longitudinally of said cylinder and having an arcuate outer surface, a floor plate covering said pit and having an aperture through which the upper portion of said cylinder extends; a variable speed drive for said cylinder shaft, including a motor mounted on said floor plate; a pair of guards attached to said floor plate and enclosing the exposed ends of said cylinders; a pair of stop rests disposed adjacent opposite ends of said cylinder in a position to receive the opposite front or rear wheel of an automobile when one of the wheels is supported on said cylinder, each said rest having an inclined approach and leaving surface and an arcuate central well adapted to receive the said automobile wheel, at least one said stop rest being mounted on said floor plate, and said stop rests being adapted to prevent movement of said automobile off of said cylinder during rotation thereof, without additional fastening or attaching devices; and control means for said motor including a movable control cable and a control box on the outer end thereof, said control box including stop and start push buttons and a control device for varying the speed of said motor, said control box being adapted to be taken into an automobile during testing thereof.

4. Apparatus for testing a vehicle for rattles, squeaks and the like, such vehicle having a plurality of wheels, comprising a horizontally disposed rotatable, shaft-like member having attached to the periphery thereof a series of substantially equally spaced pipe-like members each having an arcuate outer surface and extending in the axial direction of said shaft-like member, for engagement with the lower periphery of the vehicle wheel to impart a series of impacts in succession to one said wheel of said vehicle while rotating said wheel by engagement therewith; means for supporting said shaft-like member for rotation; means for rotating said shaft-like member and for changing the speed of rotation thereof; and a stop disposed for engagnig a companion wheel of said vehicle to prevent movement of the said vehicle during such impacts, said stop having inclined approach and leaving surfaces and a well therebetween, for receiving said companion wheel.

5. Apparatus for testing a wheeled vehicle, such as an automobile, for rattles, squeaks and the like, comprising a horizontally disposed shaft; a plurality of substantially equally spaced pipe-like members each having an arcuate outer surface and extending in the axial direction of said shaft, said pipe-like members being mounted in fixed relation to said shaft and with the axes thereof at substantially equal distances from the axis of said shaft, said pipe-like members being rotatable by said shaft around a circular path and thereby being adapted to impart a series of impacts in succession to the lower periphery of said wheel of said vehicle while rotating said wheel by engagement therewith; supporting means for a wheel of said vehicle to be driven to and from and across the position of said pipe-like members, said supporting means forming an aperture in which said pipe-like members are positioned; bearings for said shaft and disposed at the side of said aperture; variable speed means for rotating said shaft; and a stop disposed for engaging a companion wheel of said vehicle to prevent movement of the said vehicle during such impacts, said stop having inclined approach and leaving surfaces and a well therebetween, for receiving said companion wheel.

6. Apparatus for testing a vehicle for rattles, squeaks and the like, such vehicle having a plurality of wheels, comprising a horizontally disposed cylinder mounted for rotation about its longitudinal axis and adapted to support one wheel of said vehicle, the surface of said cylinder including a plurality of pipe-like members parallel with and mounted on said cylinder; change speed means for rotating said cylinder; and a stop device for engaging a companion wheel to prevent movement of said vehicle during such impacts, said stop device having at each end an inclined approach and leaving surface and a central well adapted to receive said companion wheel.

References Cited in the file of this patent

UNITED STATES PATENTS

| Number | Name | Date |
|---|---|---|
| 991,381 | Simmers | May 2, 1911 |
| 1,478,532 | Schafer | Dec. 25, 1923 |
| 1,511,496 | Belden | Oct. 14, 1924 |
| 1,511,818 | Moore | Oct. 14, 1924 |
| 1,669,451 | Brandwood | May 15, 1928 |
| 1,878,380 | Collins | Sept. 20, 1932 |
| 1,893,932 | Dewey | Jan. 10, 1933 |
| 1,921,320 | Palmer | Aug. 8, 1933 |
| 2,013,235 | Collins | Sept. 3, 1935 |
| 2,076,759 | Atti et al. | Apr. 13, 1937 |
| 2,141,639 | Catalano | Dec. 27, 1938 |

FOREIGN PATENTS

| Number | Country | Date |
|---|---|---|
| 273,742 | Great Britain | Nov. 3, 1927 |
| 729,255 | France | Apr. 25, 1932 |
| 319,888 | Great Britain | Oct. 3, 1929 |